US011024043B1

(12) United States Patent
Othman et al.

(10) Patent No.: US 11,024,043 B1
(45) Date of Patent: Jun. 1, 2021

(54) SYSTEM AND METHOD FOR VISUALLY TRACKING PERSONS AND IMPUTING DEMOGRAPHIC AND SENTIMENT DATA

(71) Applicants: Abraham Othman, San Francisco, CA (US); Enis Aykut Dengi, Tempe, AZ (US); Ishan Agrawal, Pleasanton, CA (US); Jeff Kershner, San Francisco, CA (US); Peter Martinez, San Francisco, CA (US); Paul Mills, San Francisco, CA (US); Abhinav Yarlagadda, San Francisco, CA (US)

(72) Inventors: Abraham Othman, San Francisco, CA (US); Enis Aykut Dengi, Tempe, AZ (US); Ishan Agrawal, Pleasanton, CA (US); Jeff Kershner, San Francisco, CA (US); Peter Martinez, San Francisco, CA (US); Paul Mills, San Francisco, CA (US); Abhinav Yarlagadda, San Francisco, CA (US)

(*) Notice: Subject to any disclaimer, the term of this patent is extended or adjusted under 35 U.S.C. 154(b) by 0 days.

(21) Appl. No.: 16/833,220

(22) Filed: Mar. 27, 2020

(51) Int. Cl.
*G06T 7/292* (2017.01)
*H04N 7/18* (2006.01)
(Continued)

(52) U.S. Cl.
CPC .......... *G06T 7/292* (2017.01); *G06K 9/00268* (2013.01); *G06K 9/00295* (2013.01); *G06K 9/00771* (2013.01); *G06Q 30/0201* (2013.01); *G06Q 30/0631* (2013.01); *G06T 7/246* (2017.01); *H04N 7/181* (2013.01);
(Continued)

(58) Field of Classification Search
CPC ............. G06T 7/292; G06T 7/246; G06T 2207/30201; G06T 2207/10016; G06T 2207/20084; G06Q 30/0201; G06Q 30/0631; G06K 9/00295; G06K 9/00268; G06K 9/00771; H04N 7/181
See application file for complete search history.

(56) References Cited

U.S. PATENT DOCUMENTS 8,009,863 B1* 8/2011 Sharma .............. G06K 9/00335
382/100
8,098,888 B1 1/2012 Mummareddy et al.
(Continued)

*Primary Examiner* — Nam D Pham
(74) *Attorney, Agent, or Firm* — Goldstein Law Offices, P.C.

(57) ABSTRACT

A visual tracking system for tracking and identifying persons within a monitored location, comprising a plurality of cameras and a visual processing unit, each camera produces a sequence of video frames depicting one or more of the persons, the visual processing unit is adapted to maintain a coherent track identity for each person across the plurality of cameras using a combination of motion data and visual featurization data, and further determine demographic data and sentiment data using the visual featurization data, the visual tracking system further having a recommendation module adapted to identify a customer need for each person using the sentiment data of the person in addition to context data, and generate an action recommendation for addressing the customer need, the visual tracking system is operably connected to a customer-oriented device configured to perform a customer-oriented action in accordance with the action recommendation.

19 Claims, 11 Drawing Sheets

(51) Int. Cl.
  *G06T 7/246* (2017.01)
  *G06K 9/00* (2006.01)
  *G06Q 30/06* (2012.01)
  *G06Q 30/02* (2012.01)

(52) U.S. Cl.
  CPC ............... *G06T 2207/10016* (2013.01); *G06T 2207/20084* (2013.01); *G06T 2207/30201* (2013.01)

(56) References Cited

U.S. PATENT DOCUMENTS

| | | |
|---|---|---|
| 8,295,597 B1 | 10/2012 | Sharma et al. |
| 9,041,786 B2 | 5/2015 | Hamabashiri et al. |
| 9,134,399 B2 | 9/2015 | Brown et al. |
| 9,336,433 B1 | 5/2016 | Ortiz et al. |
| 9,532,012 B1 | 12/2016 | Chen et al. |
| 10,152,517 B2 | 12/2018 | Slaney et al. |
| 2006/0010028 A1 | 1/2006 | Sorensen |
| 2006/0053342 A1 | 3/2006 | Bazakos et al. |
| 2016/0092736 A1 | 3/2016 | Mai et al. |
| 2017/0237357 A1 | 8/2017 | Chen et al. |
| 2018/0349707 A1 | 12/2018 | Bataller et al. |

* cited by examiner

US 11,024,043 B1

SYSTEM AND METHOD FOR VISUALLY TRACKING PERSONS AND IMPUTING DEMOGRAPHIC AND SENTIMENT DATA

TECHNICAL FIELD

The present disclosure relates generally to a camera-based tracking system. More particularly, the present disclosure relates to a system for visually tracking and identifying persons within a customer-oriented environment for the purpose of generating customer-oriented action recommendations.

BACKGROUND

Cognitive environments which allow personalized services to be offered to customers in a frictionless manner are highly appealing to businesses, as frictionless environments are capable of operating and delivering services without requiring the customers to actively and consciously perform special actions to make use of those services. Cognitive environments utilize contextual information along with information regarding customer emotions in order to identify customer needs. Furthermore, frictionless systems can be configured to operate in a privacy-protecting manner without intruding on the privacy of the customers through aggressive locational tracking and facial recognition, which require the use of customers' real identities.

Conventional surveillance and tracking technologies pose a significant barrier to effective implementation of frictionless, privacy-protecting cognitive environments. Current vision-based systems identify persons using high resolution close-up images of faces which commonly available surveillance cameras cannot produce. In addition to identifying persons using facial recognition, existing vision-based tracking systems require prior knowledge of the placement of each camera within a map of the environment in order to monitor the movements of each person. Tracking systems that do not rely on vision rely instead on beacons which monitor customer's portable devices, such as smartphones. Such systems are imprecise, and intrude on privacy by linking the customer's activity to the customer's real identity.

Several examples of systems which seek to address the deficiencies of conventional surveillance and tracking technology may be found within the prior art. Instead of relying on facial recognition, these systems employ machine learning algorithms to analyze images of persons and detect specific visual characteristics, such as hairstyle, clothing, and accessories, which are then used to distinguish and track different persons. However, these systems often require significant human intervention to operate, and rely on manual selection or prioritization of specific characteristics. Furthermore, these systems rely on hand-tuned optimizations, for both identifying persons and offering personalized services, and are difficult to train accurately at scale.

As a result, there is a pressing need for a visual tracking system which provides an efficient and scalable frictionless, privacy-protecting cognitive environment by tracking and identifying persons, detecting context, demographic and sentiment data, determining customer needs, and generating action recommendations using visual data.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system for visually tracking and identifying persons at a monitored location. Accordingly, the present disclosure provides a visual tracking system comprising one or more cameras positioned at the monitored location, and a visual processing unit adapted to receive and analyze video captured by each camera. The cameras each produce a sequence of video frames which include a prior video frame and a current video frame, with each video frame containing detections which depict one or more of the persons. The visual processing unit establishes a track identity for each person appearing in the previous video frame by detecting visual features and motion data for the person, and associating the visual features and motion data with an incumbent track. The visual processing unit then calculates a likelihood value that each detection in the current video frame matches one of the incumbent tracks by combining a motion prediction value with a featurization similarity value, and matches each detection with one of the incumbent tracks in a way that maximizes the overall likelihood values of all the matched detections and incumbent tracks.

It is another aspect of an example embodiment in the present disclosure to provide a system capable of distinguishing new persons from persons already present at the monitored location. Accordingly, the visual processing unit is adapted to define a new track for each detection within the current frame. The likelihood value that each detection corresponds to each new track is equal to a new track threshold value which can be increased or decreased to influence the probability that the detection will be matched to the new track rather than one of the incumbent tracks.

It is yet another aspect of an example embodiment in the present disclosure to provide a system employing machine learning processes to discern the visual features of each person. Accordingly, the visual processing unit has a person featurizer with a plurality of convolutional neural network layers for detecting one or more of the visual features, trained using a data set comprising a large quantity of images of sample persons viewed from different perspectives.

It is a further aspect of an example embodiment in the present disclosure to provide a system for maintaining the track identity of each person when viewed by multiple cameras to prevent duplication or misidentification. Accordingly, the visual tracking system is configured to compare the visual features of the incumbent tracks of a first camera with the incumbent tracks of a second camera, and merge the incumbent tracks which depict the same person to form a multi-camera track which maintains the track identity of the person across the first and second cameras.

It is still a further aspect of an example embodiment in the present disclosure to provide a system for imputing demographic and sentiment information describing each person. Accordingly, the person featurizer is adapted to analyze the visual features of each person and extract demographic data pertaining to demographic classifications which describe the person, as well as sentiment data indicative of one or more emotional states exhibited by the person.

It is yet a further aspect of an example embodiment in the present disclosure to provide a system capable of utilizing visually obtained data to create frictionless environment for detecting a customer need for each person in a customer-oriented setting and generating action recommendations for addressing the customer need. Accordingly, the visual tracking system has a recommendation module adapted to determine context data for each person, and utilize the context data along with the demographic and sentiment data of the person to identify the customer need and generate the appropriate action recommendation. The context data is drawn from a list comprising positional context data, group context data, environmental context data, and visual context data. The visual tracking system is also operably configured to communicate with one or more customer-oriented devices capable of carrying out a customer-oriented action in accordance with the action recommendation. In certain embodiments, the context data may further comprise third party context data obtained from an external data source which is relevant to determining the customer need of the person, such as marketing data.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
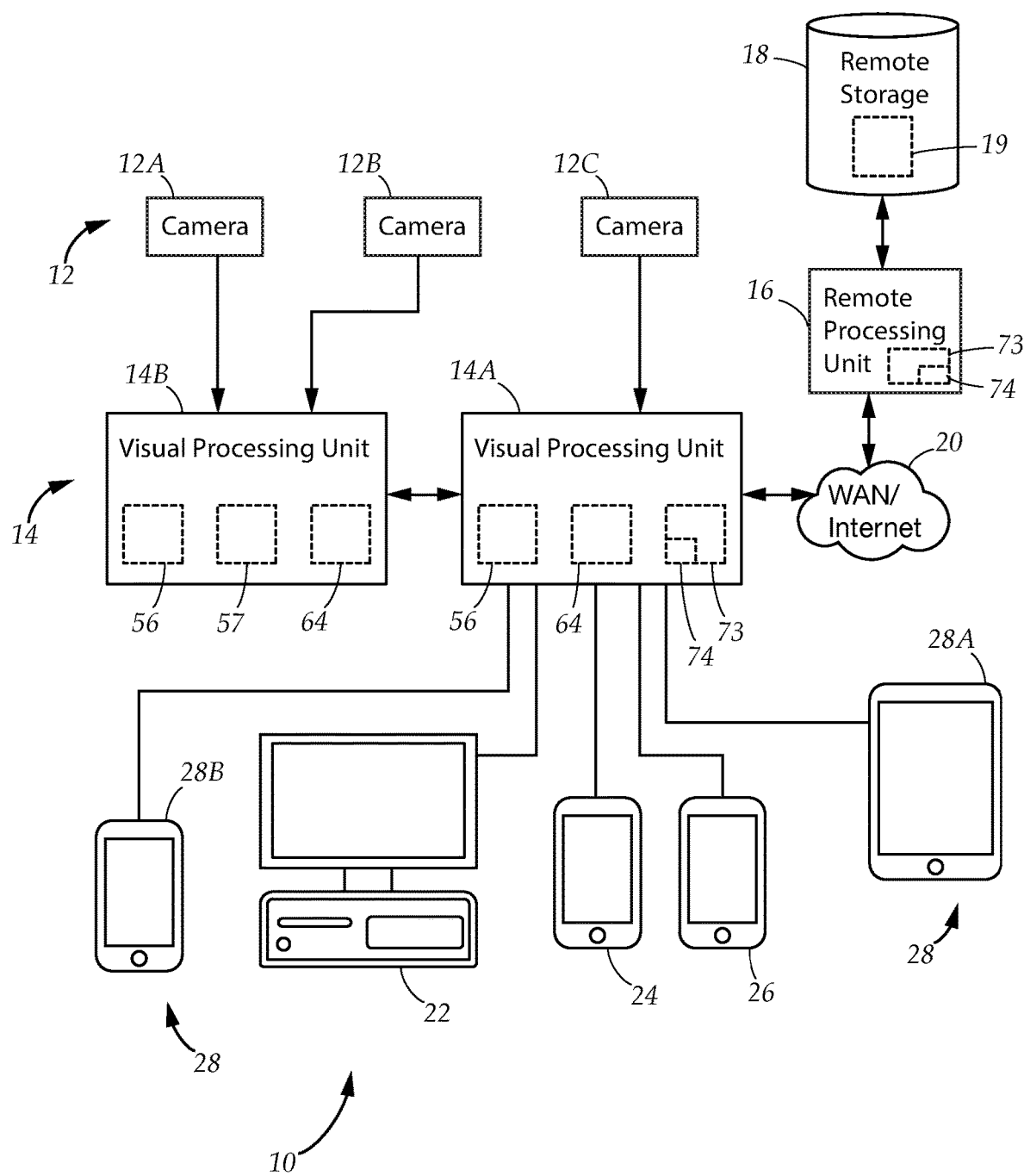
FIG. 1A is a block diagram depicting a visual tracking system, in accordance with an embodiment in the present disclosure.
Figure 1B:
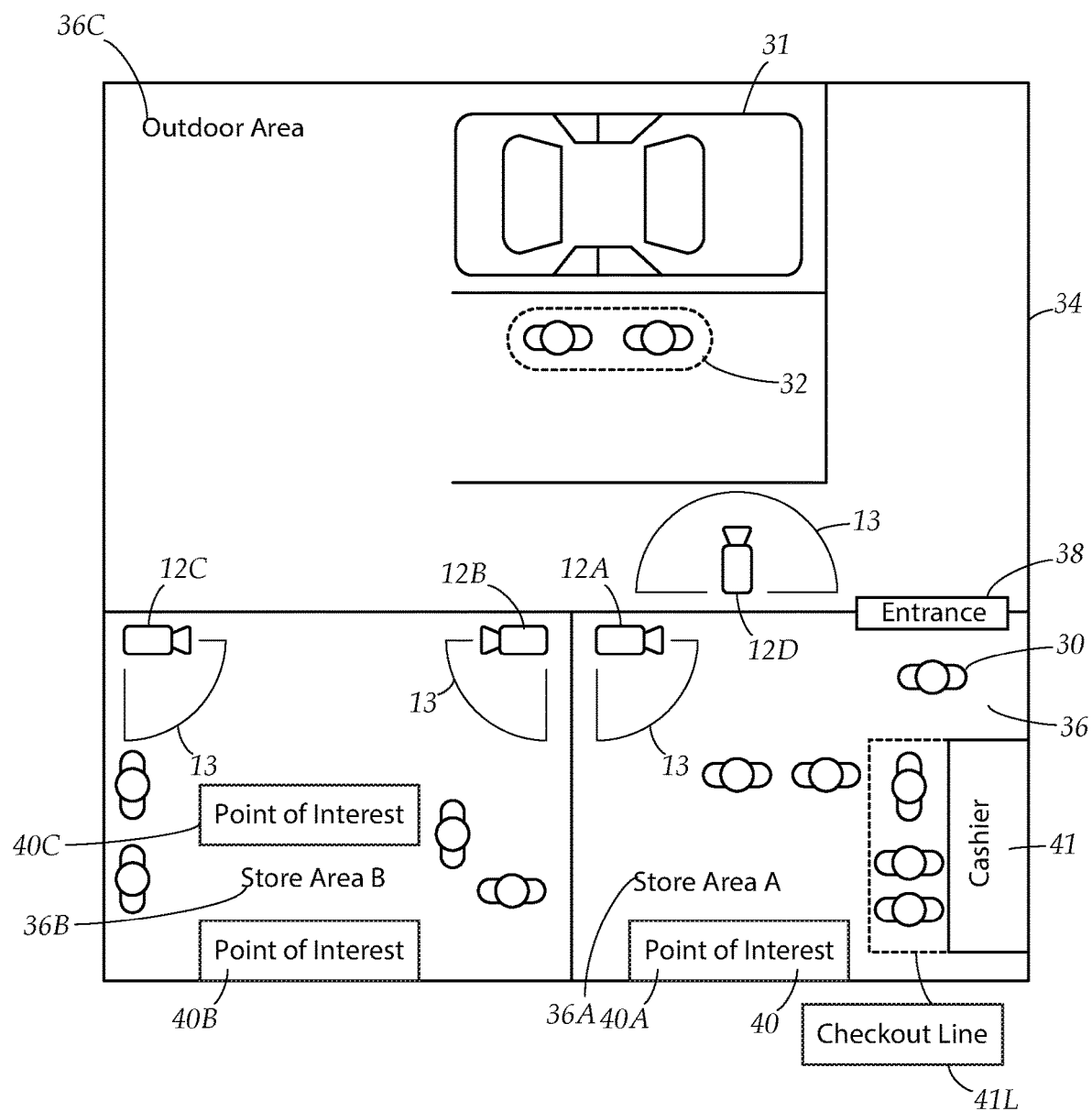
FIG. 1B is diagrammatical plan view depicting a monitored location divided between multiple observed areas, each area being observed by one or more cameras, the cameras being adapted to detect and track one or more persons within the location, in accordance with an embodiment in the present disclosure.
Figure 2A:
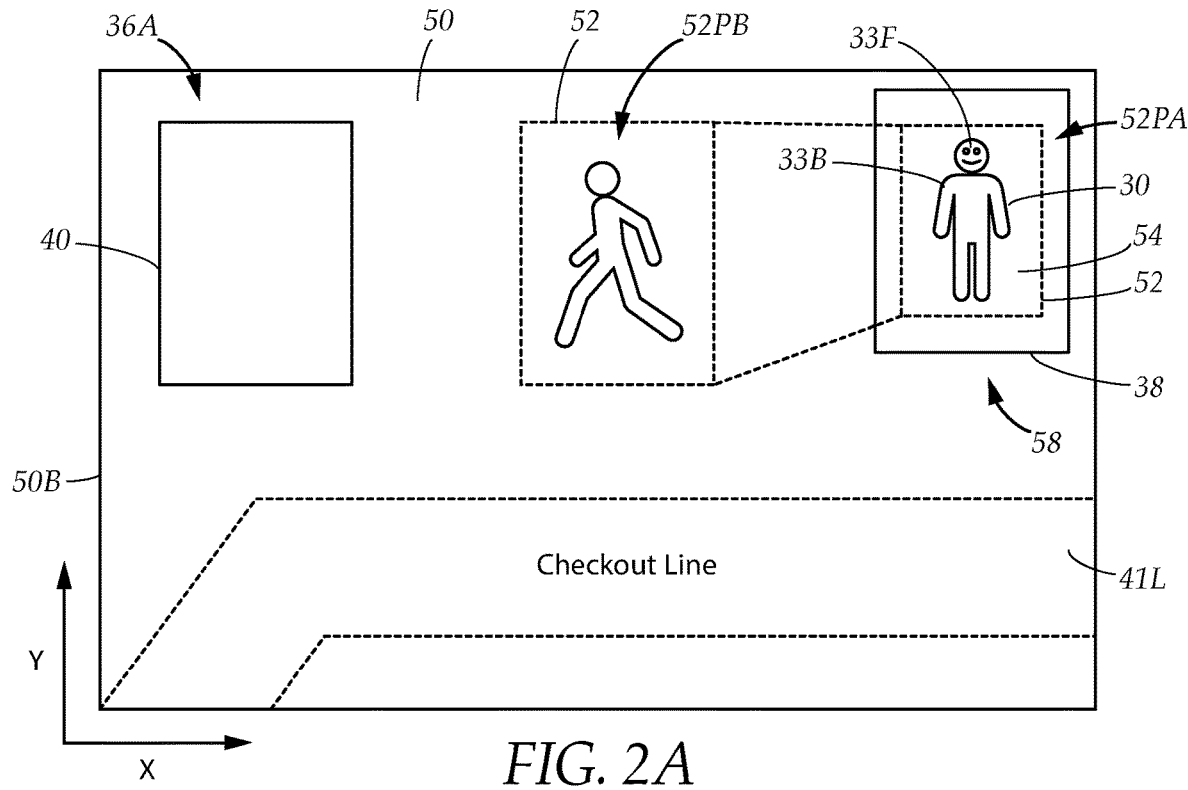
FIG. 2A is a block diagram depicting a video frame captured by one of the cameras, showing a person detected within one of the observed areas, the person moving between a first and second position, in accordance with an embodiment in the present disclosure.
Figure 2B:
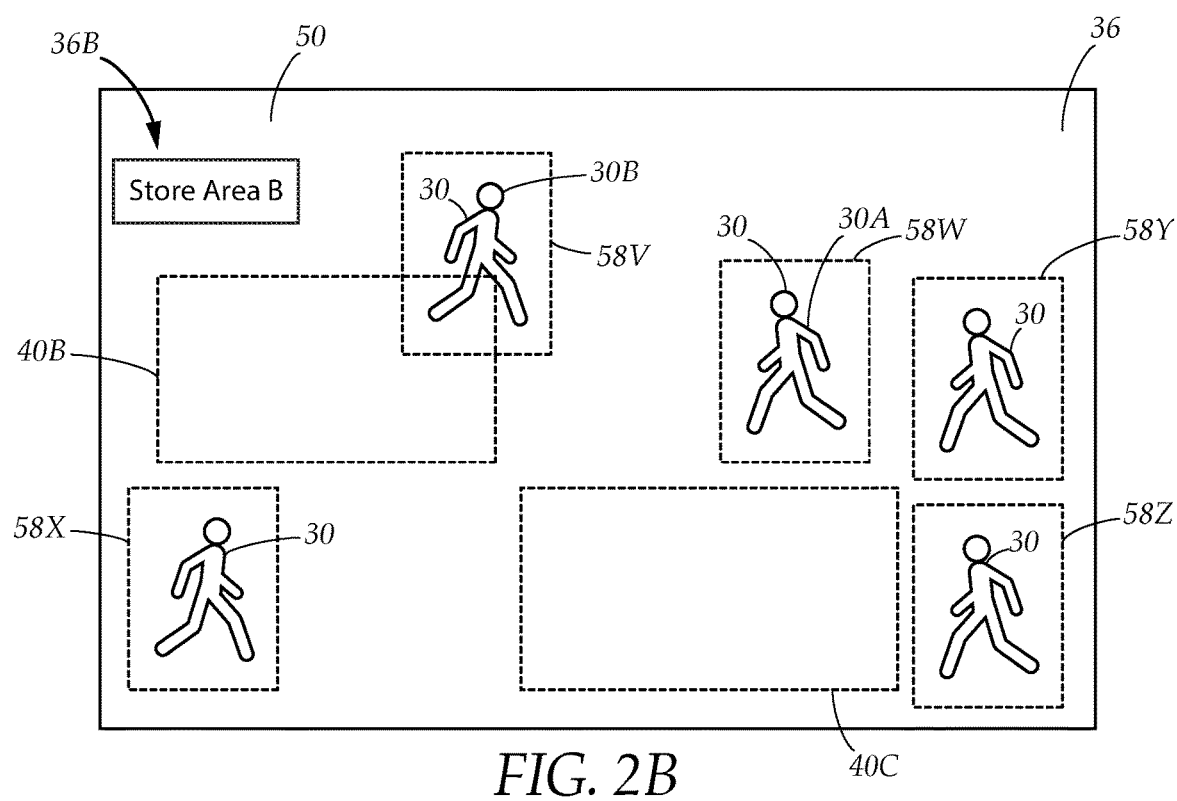
FIG. 2B is a block diagram depicting a video frame captured by another one of the cameras, showing multiple persons, in accordance with an embodiment in the present disclosure.

FIG. 1A illustrates a visual tracking system 10 comprising a plurality of cameras 12 operably connected to one or more visual processing units 14. Referring to FIG. 1B alongside FIG. 1A, the cameras 12 are positioned within a monitored location 34 which can be a space such as an interior or exterior of a structure, a segment of land, or a combination thereof. Referring to FIG. 1B and FIGS. 2A-B along while continuing to refer to FIG. 1A, each camera 12 has a field of view 13 which covers a portion of the monitored location 34, with each such portion corresponding to an observed area 36, and each camera 12 is configured to capture video and/or images of its corresponding observed area 36. For example, the monitored location 34 may be a retail store, which may be divided into one or more observed areas 36. The video captured by the cameras 12 is transmitted to the visual processing units 14 for analysis, allowing the visual tracking system 10 to visually observe and distinguish one or more persons 30 within the monitored location 34, while associating each person 30 with a track identity.

Figure 1C:
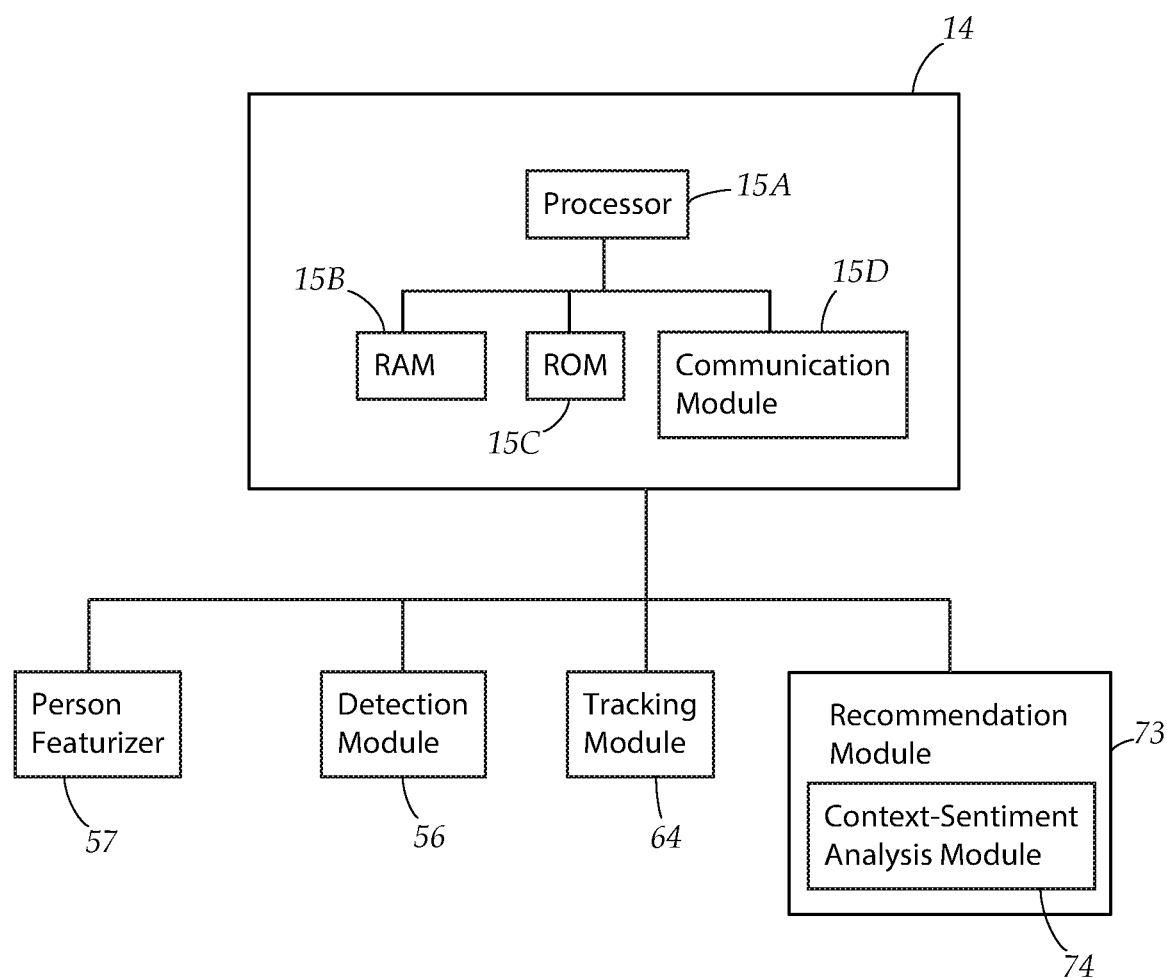
FIG. 1C is a block diagram depicting an exemplary visual processing unit, in accordance with an embodiment in the present disclosure.

Referring to FIG. 1C as well as FIGS. 1A-B, the visual processing unit 14 may be a computing device located at the monitored location 34, which is capable of controlling the functions of the visual tracking system 10 and executing one or more visual analytical processes. The visual processing unit 14 is operably connected to the cameras 12 via cable or wirelessly using any appropriate wireless communication protocol. The visual processing unit 14 has a processor 15A, a RAM, 15B, a ROM 15C, as well as a communication module 15D adapted to transmit and receive data between the visual processing unit 14 and the other components of the visual tracking system 10. One or more visual processing units 14 may be employed, and the analytical processes of the visual tracking system 10 may be distributed between any of the individual visual processing units 14. In certain embodiments, the visual tracking system 10 further has a remote processing unit 16 which is operably connected to the visual processing unit 14 by a data communication network 20 such as the internet or other wide area network. The remote processing unit 16 may be any computing device positioned externally in relation to the monitored location, such as a cloud server, which is capable of executing any portion of the analytical processes or modules required by the visual tracking system 10.

The visual tracking system 10 further comprises a recommendation module 73, which is adapted to utilize tracking and classification data obtained for each person 30 via the cameras 12, to determine customer needs and formulate appropriate recommendations suitable for a customer-oriented environment, such as a retail or customer service setting. The visual tracking system 10 is further operably connected to one or more customer-oriented devices performing retail or service functions, such as a digital information display 28, a point of sale (POS) device 22, a staff user device 24, or a customer user device 26. Each of the customer-oriented devices may correspond to a computer, tablet, mobile phone, or other suitable computing device, as well as any network-capable machine capable of communicating with the visual tracking system 10. The customer-oriented devices may further correspond to thermostats for regulating temperatures within the monitored location, or lighting controls configured to dim or increase lighting intensity.

Turning to FIG. 2A while continuing to refer to FIGS. 1A-1C, each camera 12 may be a conventional video camera which captures a specified number of frames per second, with each video frame 50 comprising an array of pixels. The pixels may in turn be represented by RGB values, or using an alternative format for representing and displaying images electronically. In an example embodiment, each camera 12 may produce an output corresponding to a frame rate of fifteen video frames over a period of one second. Timing information is also recorded, such as by timestamping the video frames 50. The visual processing unit 14 is adapted to receive the video frames 50 as input, and has a detection module 56 which is adapted to identify an image of a person 30 within each video frame 50. Each of the images of persons corresponds to one detection 58. The detection module 56 may be implemented using various image processing algorithms and techniques which are known to a person of ordinary skill in the art in the field of the invention. In certain embodiments, the cameras 12 may be configured for edge computing, and an instance of the detection module 56 may be implemented within one or more of the cameras 12.

The visual tracking system 10 is adapted to establish a coherent track identity over time for each of the persons 30 visible to the cameras 12, by grouping together the detections 58 in each of the video frames 50 and associating these detections with the correct person 30. In a preferred embodiment, this is achieved by the use of motion prediction as well as by identifying visual features for each detection 58. In one embodiment, the portion of the video frame 50 constituting the detection 58 may be contained within a bounding box 52 which surrounds the image of the person within the video frame 50. Once a detection 58 has been identified, the visual processing unit 14 performs the motion prediction by determining motion data for each detection 58 comprising position, velocity, and acceleration. For example, the position, velocity, and acceleration of the detection 58 may be measured relative to x and y coordinates corresponding to the pixels which constitute each video frame 50. The motion prediction employs the motion data of the detection 58 in one video frame 50, and to predict the position of the detection 58 in a subsequent video frame 50 occurring later in time, and determine a likelihood that a detection 58 within the subsequent video frame 50 corresponds to the original detection 58. This may be represented using a motion prediction value. Various motion prediction algorithms are known to those of ordinary skill in the art. In a preferred embodiment, the visual processing unit 14 is adapted to perform the motion prediction using a Kalman filter.

Referring to FIG. 2A alongside FIG. 1A, a person 30 may be detected within a video frame 50 at a first position 52PA. In a subsequent video frame, shown here superimposed upon the first video frame 50, a person 30 may be detected at a second position 52PB. Through the motion prediction algorithm, the visual processing unit 14 may determine the probability that the first detection 58 at the first position 52PA corresponds to the subsequent detection at the second position 52PB, based on the motion data of the first detection 58.

Figure 3A:
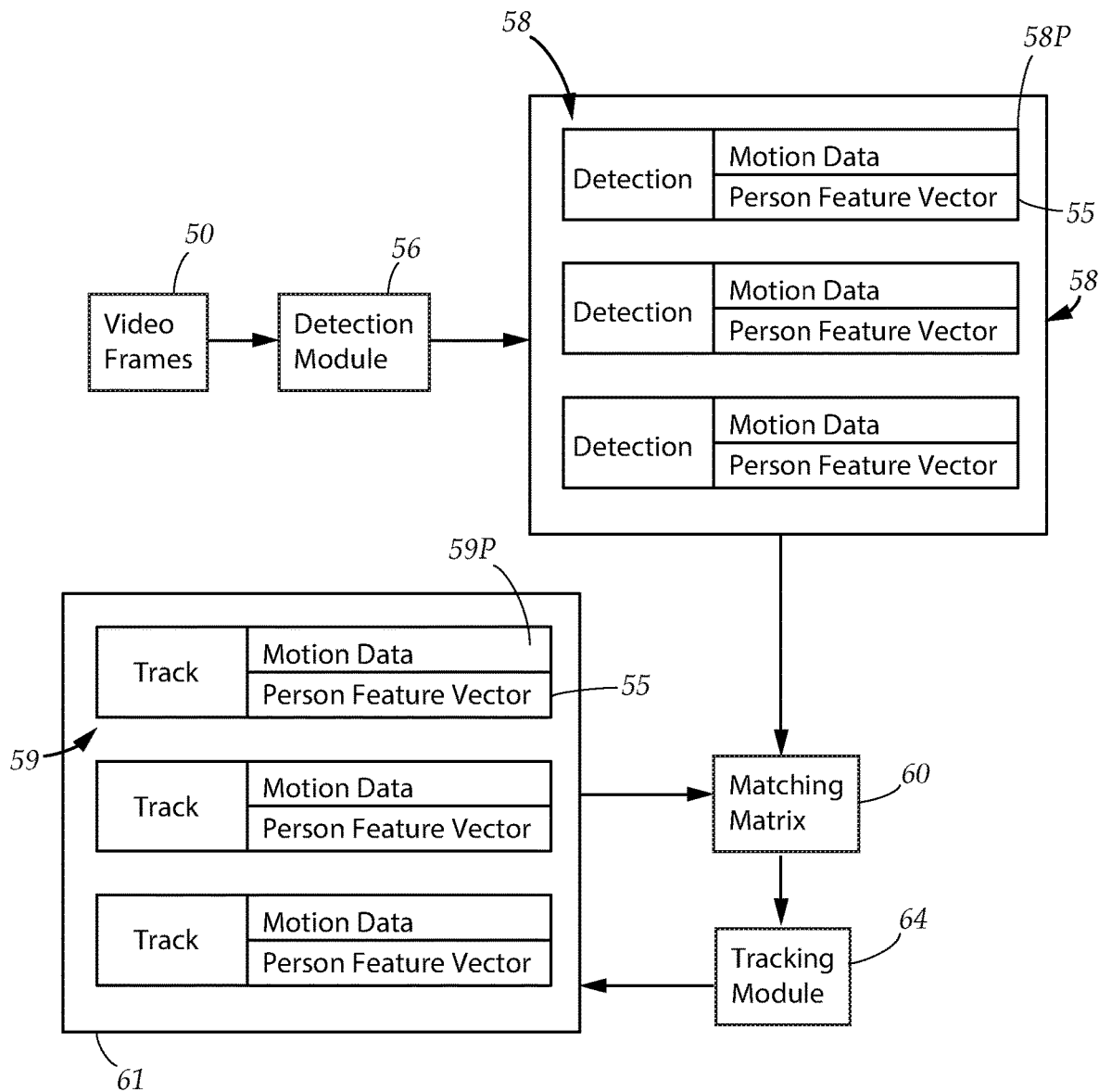
FIG. 3A is a block diagram showing detections and tracks which serve as inputs to a matching matrix, in accordance with an embodiment in the present disclosure.
Figure 4A:
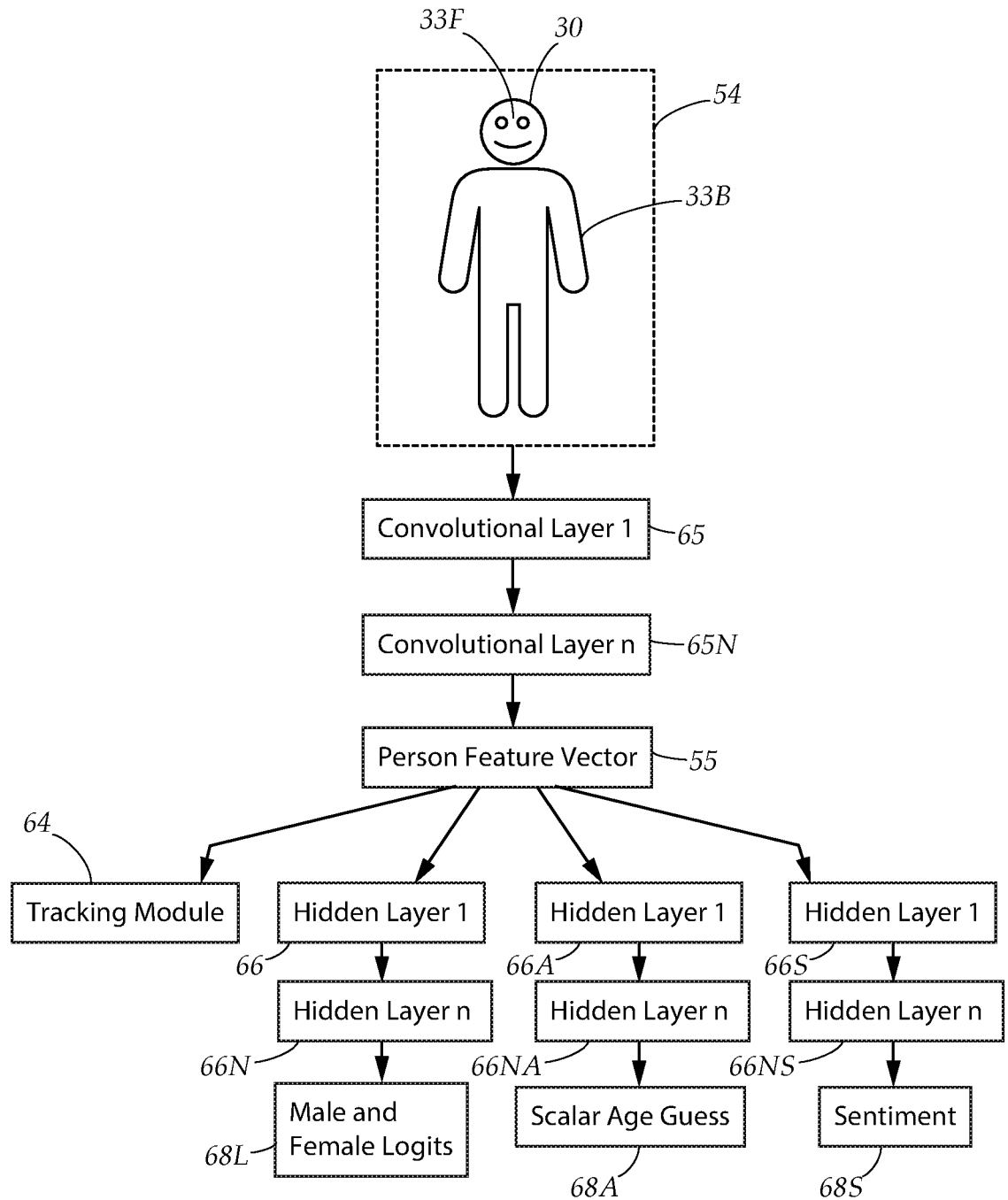
FIG. 4A is a block diagram depicting an example neural network for tracking individual persons and detecting demographic and sentiment data, in accordance with an embodiment in the present disclosure.

Turning to FIG. 3A, while also referring to FIG. 1A, FIG. 1O, and FIG. 2A, the visual processing unit 14 is further adapted to analyze the visual features of the person corresponding to each detection 58, through a person featurizer 57. The person featurizer 57 is adapted to receive an input image 54 of a person 30 and output featurization data. In a preferred embodiment, the featurization data is contained within a person feature vector 55 that describes the person 30 in a latent vector space. The person featurizer 57 is implemented and trained using machine learning techniques, such as through a convolutional neural network, to produce a set of filters which detect certain visual features of the person. Turning to FIG. 4A while also referring to FIG. 1O, FIG. 2A, and FIG. 3A, the person featurizer 57 has a plurality of convolutional layers 65, 65N, each adapted to detect certain visual features present within the input image 54.

In a preferred embodiment, the portion of the video frame 50 within the bounding box 52 is used as the input image 54. The visual features may include any portion of the person's body 33B or face 33F which constitute visually distinguishing characteristics. Note that the visual tracking system does not explicitly employ specific visual characteristics to classify or sort any of the input images 54. Instead, the person featurizer 57 is trained using a neural network, using a large dataset comprising full-body images of a large number of persons, with the images of each person being taken from multiple viewing perspectives. This training occurs in a black box fashion, and the features extracted by the convolutional layers 65, 65N may not correspond to concepts or traits with human interpretable meaning. For example, conventional identification techniques rely on the detection of specific human-recognizable traits, such as hairstyle, colors, facial hair, the presence of glasses or other accessories, and other similar characteristics to distinguish between different people. However, the person featurizer 57 instead utilizes the pixel values which make up the overall input image 54, to form a multi-dimensional expression in the feature space, which is embodied in the person feature vector 55. The person featurizer 57 is thus adapted to analyze the visual features of each person as a whole, and may include any number of convolutional layers 65 as necessary. As a result, the person featurizer 57 is trained to minimize a cosine distance between images depicting the same person from a variety of viewing perspectives, while increasing the cosine distance between images of different persons. Upon analyzing the input image 54, the person feature vector 55 of each detection 58 may correspond to a vector of values which embody the detected visual features, such as the result of multiplying filter values by the pixel values of the input image 54. An example person feature vector 55 may be [−0.2, 0.1, 0.04, 0.31, −0.56]. The privacy of the person is maintained, as the resulting person feature vector 55 does not embody the person's face directly.

Continuing to refer to FIG. 3A while also referring to FIG. 1A and FIGS. 2A-B, the visual processing unit 14 is adapted to distinguish between new detections 58, and incumbent tracks 59 through a tracking process. In one embodiment, the tracking process may be performed using a tracking module 64 implemented on the visual processing unit 14. Each incumbent track 59 corresponds to a specific detection 58 which has been identified by the visual processing unit 14 in at least one video frame 50 prior to the current video frame 50. The visual processing unit 14 maintains a record of each incumbent track 59 along with the motion data 59P of its person feature vector 55. The incumbent track 59 associated with each person 30 is therefore used to establish and maintain the track identity of the person 30. The tracking module 64 is adapted to either match each detection 58 to an incumbent track 59, or assign the detection 58 to a new track if no corresponding incumbent track 59 is present.

Figure 5:
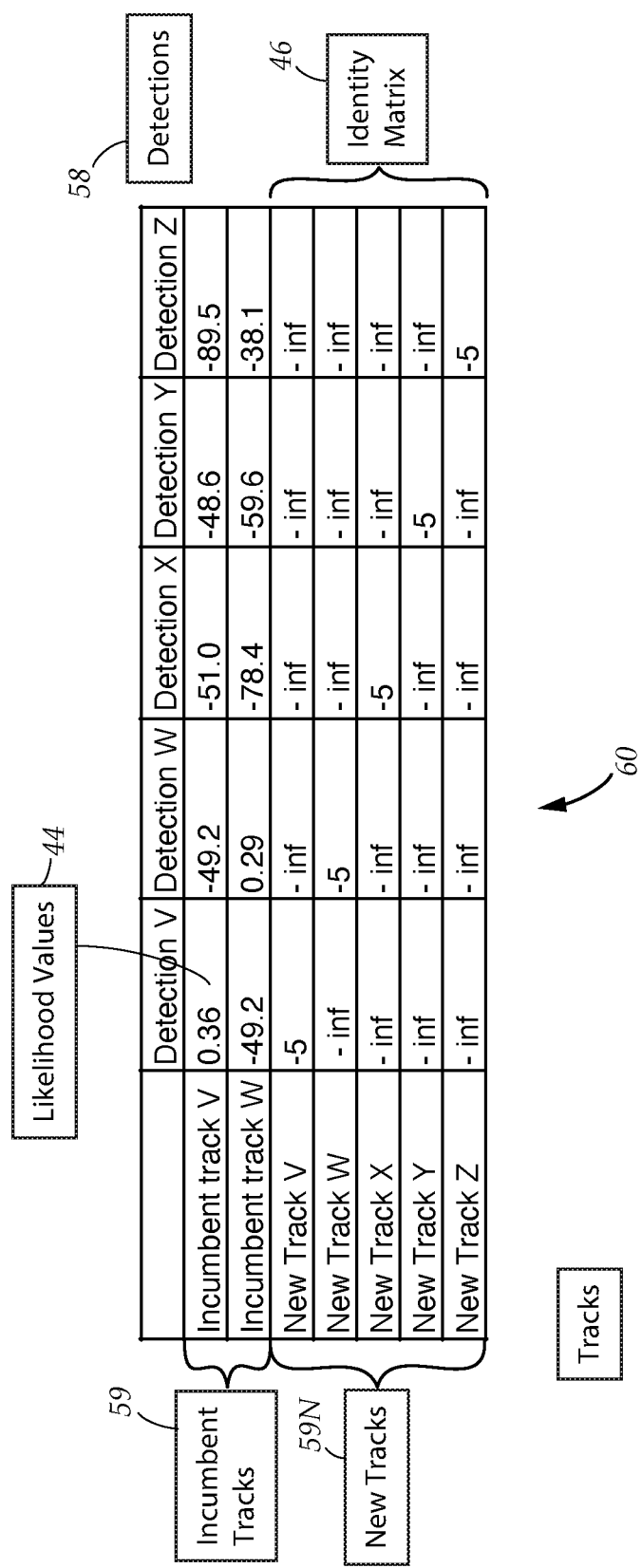
FIG. 5 is a block diagram depicting an example matching matrix, in accordance with an embodiment in the present disclosure.

Turning to FIG. 5 while also referring to FIG. 2A-B and FIG. 3A, in a preferred embodiment, the tracking process utilizes a matching matrix 60, with rows representing incumbent tracks 59, and columns representing detections 58. Each entry in the matching matrix 60 forms a predictive pairing between one of the detections 58 and one of the tracks 59, and represents a proportional likelihood 44 that the person depicted in the detection 58 of the particular column matches the person identified by the track 59 of the particular row. In a preferred embodiment, the likelihood 44 is represented by adding together the log-likelihood of the motion prediction value and the log-likelihood of a featurization similarity value. The motion prediction value represents the probability that a detection 58 matches an incumbent track 59 based on the respective motion data. The featurization similarity value represents the probability that the detection 58 and track 59 are based on the same person, based on the respective person feature vector 55 values. In a preferred embodiment, the featurization similarity value may correspond to a visual distance value, and may be calculated using a probability density function or various probability distribution fitting techniques. For example, Gaussian or Beta distributions may be employed.

In an example with rows and columns represented by "track i" and "detection j", the value of the likelihood 44 may be: log(Probability(track i is detection j GIVEN Kalman prob k(i,j) and Visual Distance d(i,j)). The following example provides further illustration:

P(track i is detection j|Kalman prob k(i,j) and Visual Distance d(i,j)) =P(i is j AND k(i,j) AND d(i,j))/P(k(i,j) AND v(i,j)) =P(k(i,j) AND d(i,j)|i is j) P(i is j)/SUM_x P(k(i,x) AND d(i,x)|i is x) P(i is x) ∝P(k(i,j) AND d(i,j)|i is j) =P(k(i,j)|i is j)*P(d(i,j)|i is j) =Kalman filter log likelihood+log(Beta distribution pdf of visual distance score)

The matching matrix 60 has a minimum number of rows equal to the number of tracks 59, while the number of columns is equal to the number of detections in any given video frame 50. In order to prevent incorrect matches from being made between the detections 58 and the incumbent tracks 59, the tracking process may introduce a new track 59N for each detection 58. Each new track 59N introduces a hyperparameter which influences continuity of the track identities in the form of a new track threshold value. The new track threshold increases or decreases continuity, by either encouraging or discouraging the matching of the detections 58 to one of the incumbent tracks 59. The entries of the matching matrix 60 along the rows associated with the new tracks 59N each correspond to a new track pairing, indicating the likelihood 44 that the new track 59N matches the detection 58 of each column. For example, a high new track threshold value may cause the tracking process to prioritize matching each detection 58 to a new track 59N, while a low new track threshold value may cause detections 58 to be matched to incumbent tracks 59 even if the likelihood 44 value indicates the match is relatively poor. Optimal new track threshold values may be determined through exploratory data analysis.

Once the entries of the matching matrix 60 have been populated with the likelihood values 44, the tracking process employs a combinatorial optimization algorithm to match each detection 58 to one of the incumbent tracks 59, or one of the new tracks 59N. In a preferred embodiment, the Hungarian algorithm, or Kuhn-Munkres algorithm, is used to determine a maximum sum assignment to create matchings between the detections 58 and tracks 59 that results in a maximization of overall likelihood 44 for the entire matrix. Any incumbent tracks 59 or new tracks 59N which are not matched to one of the detections 58 may be dropped from the matrix 60, and will not be carried forward to the analysis of subsequent video frames. This allows the visual processing unit to continue tracking persons 30 and preserving the track identity of each person as they move about within the monitored location, while also allowing new track identities to be created and associated with persons who newly enter the monitored location. Note that various alternative combinatorial optimization algorithms may be employed other than the Hungarian algorithm, in order to determine the maximum-sum assignments which maximize the overall likelihood 44 values.

Figure 6A:
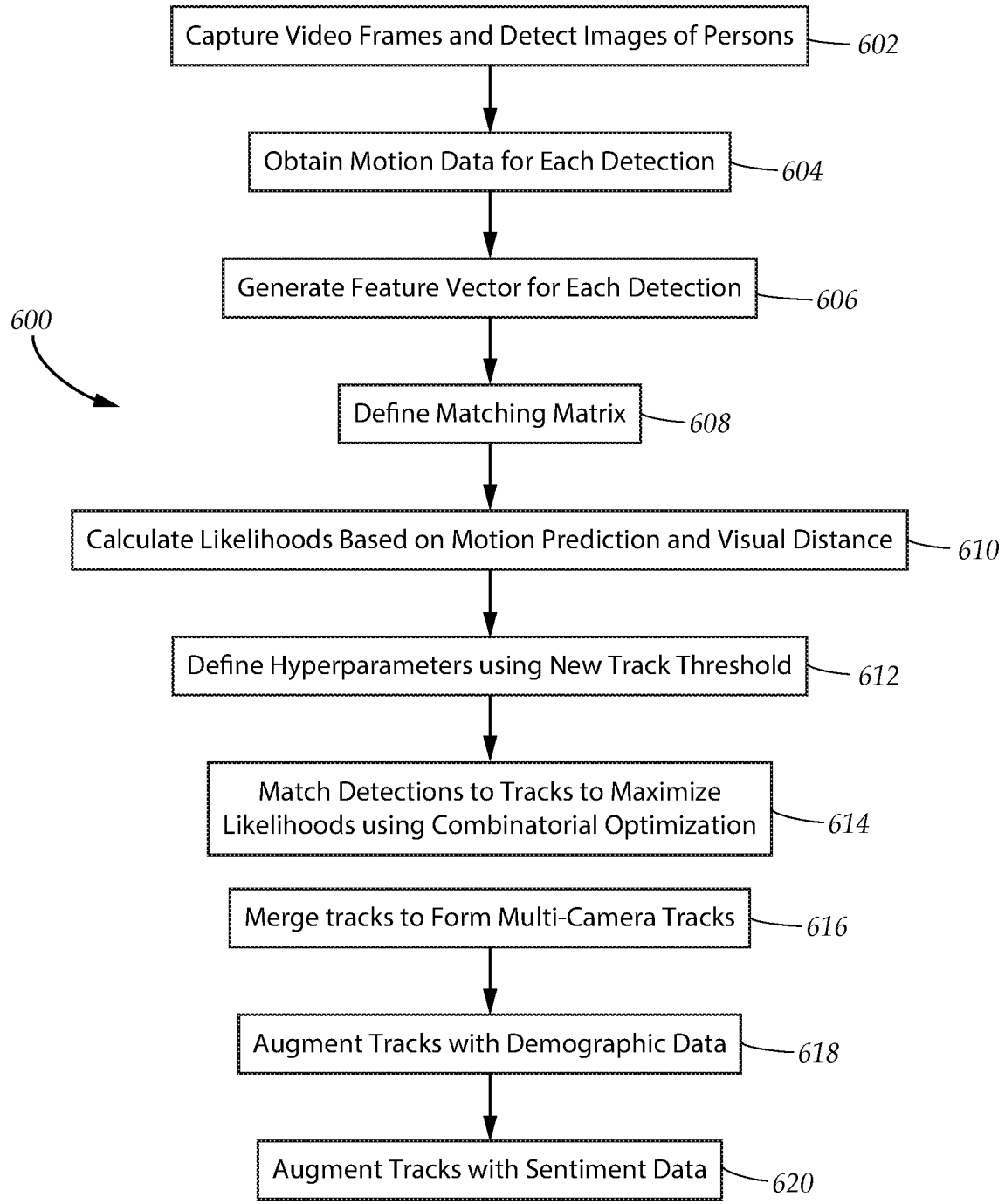
FIG. 6A is a block diagram depicting an exemplary tracking process, in accordance with an embodiment in the present disclosure.

Turning to FIG. 6A while also referring to FIG. 1A, FIG. 2B, and FIG. 3A, an exemplary tracking process 600 is shown. At step 602, the camera 12 captures video of the observed area 36 which is transmitted to the visual processing unit 14 for analysis, and the detection module 56 identifies any detections 58 present within the video frame 50. In the present example, five persons 30 are assumed to be present within the observed area. At step 604, the visual processing unit 14 obtains the motion data for each detection. Next, at step 606, the person featurizer 57 analyzes the visual features of the input image 54 associated with each detection 58 and generates the corresponding person feature vector 55.

Referring to FIG. 5 while also referring to FIG. 1A, FIG. 3A and FIG. 6A, at step 608, the matching matrix 60 is defined according to the video frame 50 (shown in FIG. 2B), where a total of five detections 58 are identified (58V, 58W, 58X, 58Y, 58Z). Each detection 58 has a corresponding column. In the present example, the matching matrix 60 has two incumbent tracks 59, corresponding to incumbent tracks V and W, and each are represented by a row in the matrix 60. In the present example, the persons represented by Detections V and W 58V, 58W were previously matched to incumbent tracks V and W in a prior video frame. However, all detections 58 are treated equally when each new video frame is analyzed. The motion data 59P and person feature vector 55 of incumbent tracks V and W are retained by the visual processing unit 14, and are compared against the motion data 58P and person feature vector 55 of each detection 58. At step 610, the matrix entries in the rows representing incumbent tracks V and W are then populated by determining the likelihood 44 values between the incumbent tracks 59 and detections 58. For example, Detection V may represent a boy wearing red clothing, while Detection W may represent a man wearing white clothing. Detections X, Y, and Z may represent different persons with distinct visual features, and none of these detections are located in close proximity to the incumbent tracks V and W within the video frame. The likelihood value 44 between Detection V and incumbent track V may be "0.36", while the likelihood 44 value between Detection W and incumbent track V may be "−49.2" which is a negative number indicating dissimilarity. Similarly, the likelihood value 44 between Detection W and incumbent track W may be "0.29". The likelihood 44 values between Detections V and W and Detections X, Y, and Z are also represented by negative numbers.

Next, at step 612, the tracking process 60 introduces hyperparameters corresponding to the new track threshold value. The matching matrix 60 includes one new track 59N for each detection 58: new tracks V, W, X, Y, and Z. Unlike the calculated likelihood 44 values which fill the matrix entries where detection 58 columns and incumbent track 59 rows intersect, the new track threshold values within the new tracks 59N are arbitrary. The new track value of the matrix entry where the new track 59N row intersects with its associated detection 58 column may be set to "−5", thus discouraging a match between the new track 59N and its associated detection 58 if another combination produces a likelihood 44 value which is positive. To prevent matches between the new track 59N and any detections other than its associated detection 58, the other matrix entries within the new track 59N row may be set to a new track threshold value of negative infinity. In one embodiment, the new tracks 59N may be appended to the matching matrix 60 in the form of an identity matrix 46 with the number of rows and columns equaling the number of detections 58. By arranging the rows of the new tracks 59N in the same order as the detection 58 columns, the new threshold values may therefore be diagonally arranged within the identity matrix 46.

Next, the tracking module 64 employs the combinatorial optimization algorithm at step 614 to create matchings between the incumbent tracks 59, new tracks 59N, and detections which maximize the likelihood 44 values of the entire matrix 60. In the present example, Detection V is matched with Incumbent Track V and Detection W is matched with Incumbent track W. Detections X, Y, and Z are matched with new tracks X, Y, and Z respectively. Any incumbent track 59 or new track 59N which is matched to one of the detections 58 will be maintained as an incumbent track 59 when the next video frame is processed by the tracking module 64, and the motion data 59P for each incumbent track 59 is updated accordingly. Any incumbent track 59 or new track 59N which is not matched to any of the detections 58, such as new tracks V and W in the present example, may be dropped or deactivated. The incumbent tracks 59 produced by each camera 12, along with the person feature vector 55 motion data 59P, constitute track data 61 of the camera 12.

Figure 3B:
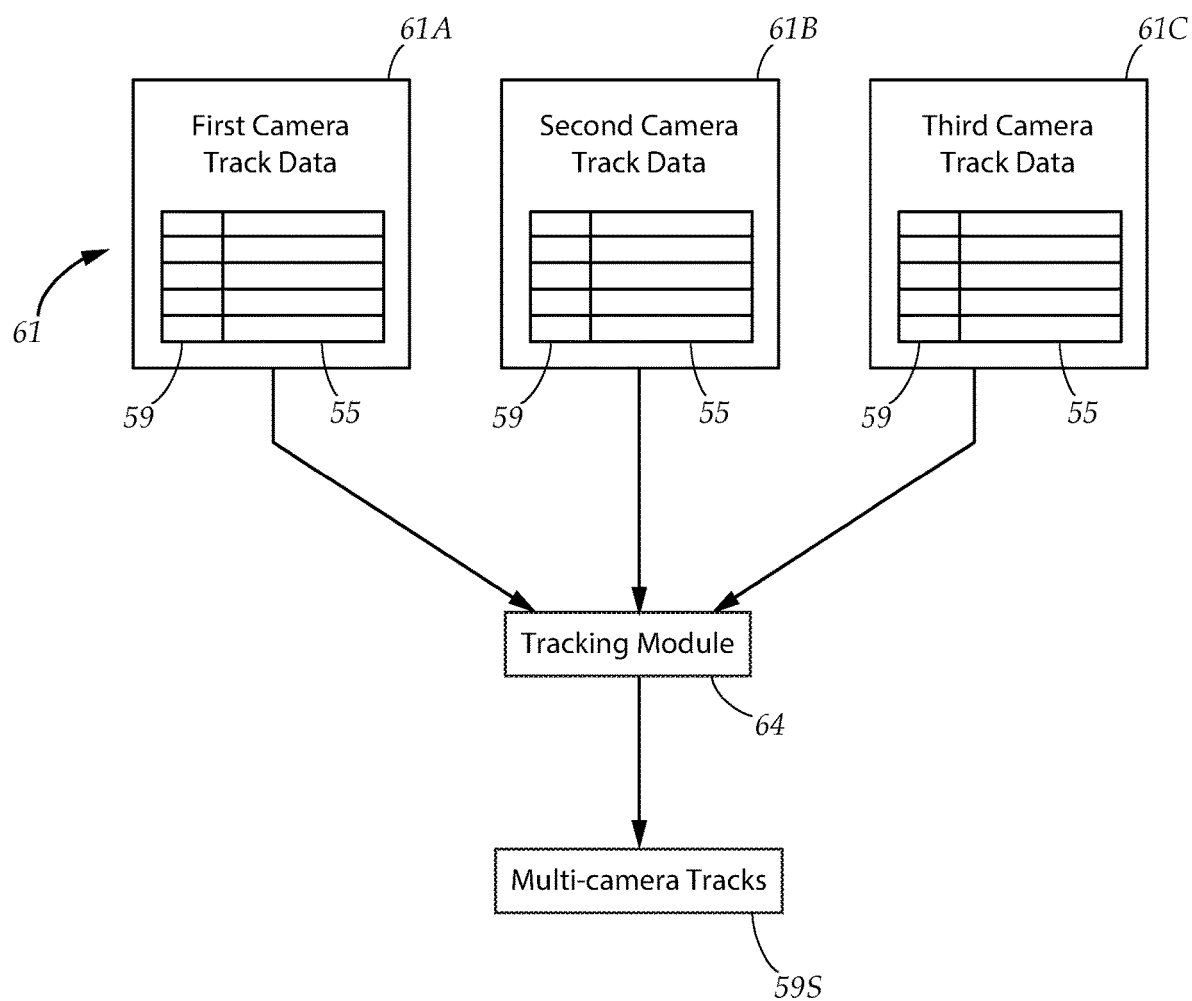
FIG. 3B is a block diagram showing a track merging process for forming multi-camera tracks, in accordance with an embodiment in the present disclosure.

Turning now to FIG. 3B, while also referring to FIGS. 1A-B, FIGS. 3A-3B, and FIG. 6A, when multiple cameras 12 are positioned throughout the monitored location 34, each camera 12 identifies detections 58 and matches them to tracks 59 in an independent manner. However, to prevent one person 30 from being misidentified as several persons by the plurality of cameras 12, the visual tracking system 10 employs a track merging process to produce one or more multi-camera tracks 59S at step 616 of the tracking process 600. When two or more visually similar tracks 59 produced by different cameras 12 are merged to form a multi-camera track 59S, the multi-camera track 59S forms a link between these tracks 59, allowing the visual tracking system 10 to maintain the tracking identity of the person 30 associated with these tracks 59 even as that person 30 moves between the fields of view 13 of different cameras 12. In situations where a person appears in the track data 61 of only one camera 12, a multi-camera track 59S may still be created for the track 59 associated with that person 30, and said multi-camera track 59S will remain eligible to be merged if the person subsequently appears within the track data 61 of other cameras 12.

In a preferred embodiment, the tracking module 64 analyzes the track data 61 produced by the plurality of cameras 12, and compares the featurization data of each track 59 against the featurization data of the tracks 59 of the other cameras. This comparison may be performed through analysis of the person feature vector 55 of each track 59 using the person featurizer 57. Each track 59 contains timing information which indicates the time which its associated video was recorded, and may further have a camera identifier indicating the camera 12 which produced the track 59. If any of the tracks 59 of one camera 12 are sufficiently similar to one of the tracks 59 of the other cameras 12, these tracks 59 are then merged to form a multi-camera track 59S. For example, the tracks 59 of two cameras 12 may be merged into one multi-camera track 59S if the visual distance between the person feature vectors 55 of the tracks 59 is sufficiently small. The multi-camera track 59S may continue to store the featurization data of each of its associated tracks, or may store an averaged or otherwise combined representation of the separate person feature vectors 55.

Furthermore, the track merging process limits the tracks 59 eligible for merging to those which occur within a set time window before the current time. The time window may be any amount of time, and may be scaled to the size of the monitored location. For example, the time window may be fifteen minutes. The time window allows the tracking module 64 to maintain the track identity of persons who leave the field of view 13 of one camera 12 and who reappear within the field of view 13 of a different camera 12. Any tracks 59 which were last active before the time window may be assumed to represent persons 30 who have exited the monitored location, and are thus excluded from the track merging process. Use of the time window therefore makes it unnecessary to account for the physical layout of the monitored location or the relative positions of the cameras 12, and the track merging process does not utilize the motion data 59P of the various tracks.

Referring to FIGS. 1A-B, FIG. 2B, and FIG. 3B, in one example, the five persons 30 (shown in FIG. 2B) may each be represented by one multi-camera track 59S. Each of the persons 30 is currently present within "Store Area B", which is within the fields of view 13 of two cameras 12B, 12C. Each person 30 is therefore represented by one track 59 within the track data 61B, 610 of the two cameras 12B, 12C. Once the track merging process is completed, the multi-camera track 59S associated with each person links together the corresponding tracks 59 from each camera, thus allowing the visual tracking system 10 to register five persons via their tracking identities, even though there are ten incumbent tracks in total produced by the two cameras 12B, 12C.

Returning to FIG. 4A while also referring to FIG. 1A, FIG. 3A-B, and FIG. 6A, the visual tracking system 10 is further adapted to augment the tracks 59 by detecting demographic information based on the featurization data already associated with each track 59. In a preferred embodiment, the person featurizer 57 is configured with demographic classifiers which have been trained using featurization data extracted from images of a large number of average persons. Each classifier is adapted to recognize one or more demographic values, and is implemented using one or more fully-connected hidden neural network layers for detecting those demographic values. For example, one classifier may be adapted to determine gender, and therefore one or more gender hidden layers 66, 66N are used utilized which are mapped to a logit vector 68L of male and female categories. Another classifier may be adapted to determine age, and may utilize one or more age hidden layers 66A, 66NA which are mapped to a scalar age value 68A. The person featurizer 57 may also be adapted to detect other scalar or categorical demographic values, as will be apparent to a person of ordinary skill in the art in the field of the invention.

In one embodiment, the demographic values are determined at step 618 of the tracking process, by using the person feature vector 55 of each track 59 as input to the featurizer 57. Where multiple cameras 12 are employed, the demographic values may be determined using the featurization data of the multi-camera track 59S instead.

Continuing to refer to FIG. 4A while also referring to FIG. 1A, FIG. 3A-B, and FIG. 6A, the person featurizer 57 is further adapted to detect visual sentiment data 68S within the featurization data of each track 59 in order to determine one or more emotional states exhibited by each person 30. In a preferred embodiment, the sentiment data 68S is obtained at step at 620 in the tracking process 600. The person featurizer 57 is trained to detect visual characteristics indicative of various emotional states, such as facial expressions or gestures, through the use of one or more sentiment hidden layers 66S, 66NS. The emotional states may correspond to frustration, fatigue, happiness, anger, sadness, or any other relevant positive or negative emotion. By employing the person feature vector 55 associated with a track 59 or multi-camera track 59S as input, the person featurizer 57 is thus able to determine the emotional state most likely exhibited by the person 30. As with the processes for detecting visual features and demographic values, the person featurizer 57 may be trained using images of large numbers of persons, viewed from multiple perspectives. Where multiple cameras 12 are employed, the sentiment data 68S for each person 30 may be associated with the appropriate multi-camera track 59S, thus allowing the sentiment data 68S to be linked to the track identity of the person independently of the individual camera tracks.

Figure 4B:
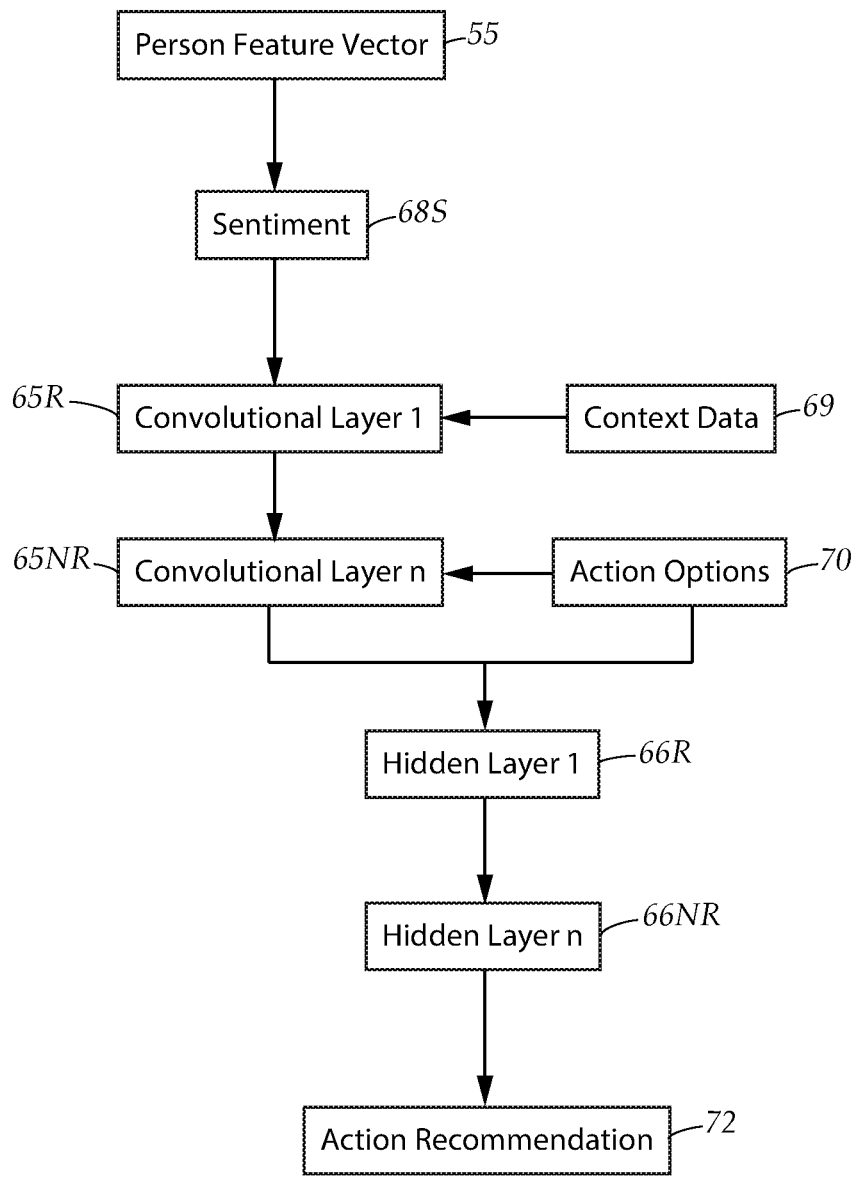
FIG. 4B is a block diagram depicting an example neural network for generating action recommendations based on sentiment and context data, in accordance with an embodiment in the present disclosure.

Turning now to FIG. 4B, while also referring to FIGS. 1A-C, FIGS. 2A-B, and FIGS. 3A-B, the visual tracking system 10 is further adapted to obtain context data 69, which is employed in combination with the augmented track data 61 in order to determine an appropriate action recommendation 72 for each person 30 within the customer-oriented environment. The context data 69 may comprise positional context data, group context data, visual feature context data, and environmental context data.

The positional context data constitutes an analysis of the motion data associated with each person 30, such as the position of the person 30 within the video frame 50. In a preferred embodiment, each video frame 50 contains one or more points of interest 40. Each point of interest 40 corresponds to a portion of the video frame 50 depicting an object or region within the monitored location 34 which is capable of enabling a customer interaction. For example, certain points of interest 40A, 40B, 40C may refer to retail shelves, information displays 28, a cashier counter 41 or a checkout line 41L. An entrance 38 or other door or entry point may also be marked as a point of interest. The positional context data does not require precise knowledge of location of the person in relation to the monitored location. Instead, the positional context data is obtained using the relative position of the person 30 within the boundaries of the video frame 50. When the motion data of the person 30 indicates the position of the person 30 is within an interaction distance of one of the points of interest 40, the recommendation module 73 will consider the customer interaction associated with the point of interest 40 when determining the action recommendation 72 for the person 30. Alternatively, proximity between the person 30 and the point of interest 40 may be determined by detecting an intersection or overlap within the video frame 50 between the bounding box 52 surrounding the person 30 and the point of interest 40. In certain embodiments, the visual tracking system 10 is operably connected to the point of sale system 22 of the monitored location 34 and is capable of retrieving stock or product information which may be related to a point of interest 40. Furthermore, orders for goods or services may be automatically placed by the visual tracking system 10 via the point of sale system 22 in order to carry out an action recommendation.

Group context data may be utilized by the visual tracking system 10 to indicate whether each person 30 is present at the monitored location 34 as an individual or as part of a group 32 of persons 30. In one embodiment, two or more persons 30 are considered to form a group 32, if the motion data of the persons indicate that the persons arrived together at the monitored location via the entrance 38 and/or remained in close mutual proximity. As such, the group context data may be related to the positional context data. In certain embodiments, the visual tracking system 10 is adapted to identify vehicles 31 such as cars and trucks, and may associate multiple persons 30 with a group 32 if the positional context data indicates each of said persons emerged from the same vehicle 31. The recommendation module 74 may further combine group status with demographic data to formulate customer needs or action recommendations which are tailored to the mixed demographic data of the group 32 as a whole. For example, a group comprising adults and children may cause the context and sentiment analysis module 74 to recommend actions suitable for a family.

The positional and group context data for each person may be obtained through any of the processes available to the visual processing unit 14. For example, positional and group context data are derived through analysis of the motion data to determine the position of tracks and their proximity in relation to other tracks and/or points of interest.

Visual context data is based on visual features embodied in the featurization data associated with a particular track. For example, the recommendation module may be configured to extract visual context data using the person featurizer 57. As with the tracking process and the training of the person featurizer 57 to extract featurization data, visual context data does not require explicit classification based on human-interpretable meanings.

Environmental context data is used to identify time and date, weather and/or temperature, as well as other environmental factors which may influence the customer need of each person 30. For example, high and low temperatures may increase demand for cold drinks or hot drinks respectively. Environmental context data may be obtained through a variety of means, such as via temperature sensors, weather data, and other means as will be apparent to a person of ordinary skill in the art. Weather data and other environmental context data may be inferred through visual characteristics, such as through visual detection of precipitation and other weather signs.

Figure 6B:
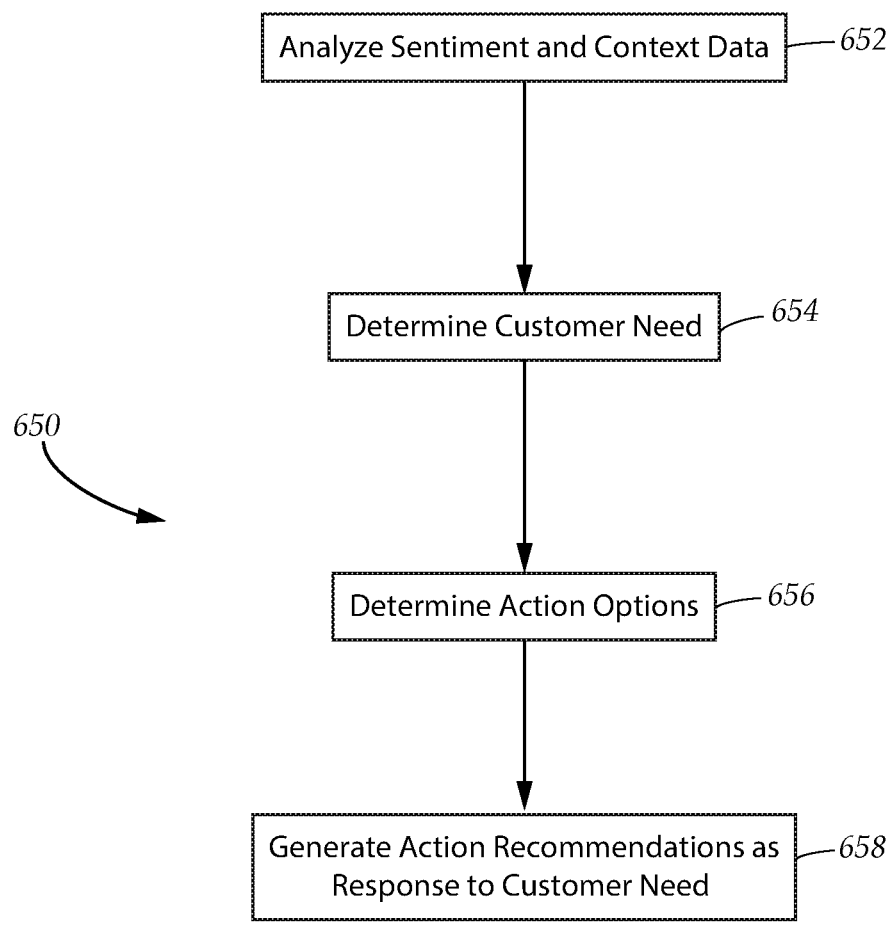
FIG. 6B is a block diagram depicting an exemplary recommendation process, in accordance with an embodiment in the present disclosure.

Turning now to FIG. 6B while also referring to FIGS. 1A-B, FIGS. 3A-B, and FIG. 4B, an example recommendation process 650 is shown. In a preferred embodiment, the recommendation module 73 may incorporate a context and sentiment analysis module 74 employing a trained neural network. To determine an action recommendation 72 for a person, the recommendation module 73 is adapted to deliver recommendation inputs to the context and sentiment analysis module 74 at step 652, comprising the sentiment data 68S of the track 59 or multi-camera track 59S associated with the person, and the relevant context data 69. In certain embodiments, the person feature vector 55 is augmented with the sentiment data 68S, and is provided as part of the recommendation input. Next, the recommendation input is analyzed to determine one or more customer needs at step 654. The context and sentiment analysis module 74 has one or more recommendation convolutional layers 65R, 65NR, which are trained to recognize one or more customer needs for the person based on a combination of the context data 69 and the sentiment data 68S. In one embodiment, the customer needs may be embodied as values within a recommendation feature vector. The recommendation inputs may also include the demographic data of the person, and the recommendation convolutional layers 65R, 65NR will be configured to account for demographic data when determining the customer need. Next, at step 656, the recommendation module 73 determines one or more action options 70. Each action option corresponds to an action that can be carried out using one of the customer-oriented devices, and may represent actions performed by the customer-oriented device which directly address the customer need when performed, or may prompt a staff member to perform the action. The action options 70 and the customer needs are then analyzed at step 658 to generate an action recommendation 72 which predicts the action option 70 best suited to address the customer need. In a preferred embodiment, the action recommendation 72 is generated using one or more recommendation hidden layers 66R, 66NR implemented using the context and sentiment analysis module 74. The recommendation convolutional layers 65R, 65NR and the recommendation hidden layers 66R, 66NR may be trained using a large datasets where the context and sentiment data, along with the action recommendation and outcome, are known. Note that the action recommendation 72 may be generated using any combination of the context data, sentiment data, or demographic data, and in certain situations, certain recommendation inputs will not be used.

In certain embodiments, the visual tracking system 10 is adapted to directly control the customer-oriented devices in order to execute or perform the appropriate action recommendation. For example, promotions or advertisements may be presented to the person by an information display 28 within viewing distance based on the positional context data. In other embodiments, the visual tracking system 10 may notify a staff member via a staff user device 24, further identifying the person requiring assistance, and the action recommendation which is to be performed by the staff member.

Turning to FIG. 1B while also referring to FIG. 1A, FIG. 2A-B, and FIG. 4B, several examples of context data 69 can be seen within the Figures. Within the observed area corresponding to Store Area A 36A (as shown in FIG. 1B), several persons 30 are shown, whose positions coincide with the checkout line 41L. One of these persons 30 may be exhibiting frustration. The recommendation module 73, based on the positional context data and sentiment data 68S, may determine that the proper action recommendation 72 for resolving the customer need is to assign an additional staff member to act as a cashier, thus expediting the checkout process and alleviating the frustration of said person.

Referring to FIG. 2B while also referring to FIG. 1A and FIG. 4B, the recommendation module 73 may determine that the person 30A has sentiment data 68S indicative of fatigue, while the environmental context data shows that the current weather is hot. Furthermore, the visual context data may denote visual features indicative of workout apparel being worn. The recommendation module 73 may therefore determine that, based on the context data 69 and sentiment data 68S, the person is in need of a cold drink, and that the optimal action recommendation corresponds to presenting the person 30A with a promotional message advertising a discount on cold drinks via an information display 28 closest to the person 30A. Other potential action recommendations may correspond to generating an order for a cold drink using the point of sale system 22 and/or notifying a staff member to prepare the order.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a visual tracking system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A visual tracking system for tracking and identifying a plurality of persons within a monitored location, comprising:

a first camera adapted to capture a sequence of video frames comprising a current video frame and a prior video frame, each video frame depicting a plurality of detections, each detection corresponding to a portion of the video frame depicting one of the persons, each detection further having visual features, and motion data describing relative movement of the person within the video frame;

a person featurizer adapted to generate a person feature vector for each detection within the current video frame describing the visual features of the detection; and a tracking module, the tracking module is adapted to define one or more incumbent tracks, each incumbent track is a track identity associated with one of the persons depicted in the prior video frame, and has an incumbent track person feature vector describing the visual features of the person, the incumbent track further having incumbent track motion data, the tracking module is further adapted to establish a predictive pairing between each detection and each incumbent track and calculate a likelihood value for each predictive pairing, the likelihood value represents a probability that the person associated with the detection corresponds to the person associated with the incumbent track, the likelihood value for each predictive pairing is obtained by combining a motion prediction probability comparing the motion data of the detection with the incumbent track motion data, and a featurization similarity probability comparing the person feature vector of the detection with the incumbent track person feature vector, the tracking module is further adapted to maintain the track identity of each person in the current frame by utilizing a combinatorial optimization to select one of the predictive pairings for each detection such that the likelihood values are maximized across all the selected predictive pairings.

2. The visual tracking system described in claim 1, wherein the tracking module is further adapted to define a new track for each detection and establish a new track pairing between each detection and each new track, the likelihood value of each new track pairing corresponds to a new track threshold, the tracking module is further adapted to select one of the predictive pairings or new track pairings for each detection via the combinatorial optimization such that the likelihood values are maximized across all the selected predictive pairings and new track pairings, whereby matching one of the detections with one of the new tracks establishes a new track identity for the person associated with the detection.

3. The visual tracking system described in claim 2, wherein the predictive pairings and the new track pairings are determined using a matching matrix maintained by the tracking module, the matching matrix having one column for each detection within the current video frame and one row for each incumbent track and one row for each new track.

4. The visual tracking system described in claim 3, wherein:
the visual tracking system further comprises a second camera, the second camera is associated with one or more second camera incumbent tracks, each second camera incumbent track has a second camera person feature vector describing the visual features one of the persons within the monitored location; and
the tracking module is further adapted to implement a track merging process whereby the person feature vector of each incumbent track of the first camera is compared to the second camera person feature vector of each second camera incumbent track, and each incumbent track and each second camera incumbent track corresponding to the same person are merged to produce a multi-camera track linked to the track identity of said person.

5. The visual tracking system described in claim 4, wherein each incumbent track and each second camera incumbent track each have a video capture time, and are eligible to be merged via the track merging process only if the associated video capture times of the incumbent track and second camera incumbent track fall within a time window occurring before a current time.

6. The visual tracking system described in claim 5, wherein the person featurizer is adapted to determine demographic data for each person via the visual features of the person's associated multi-camera track.

7. The visual tracking system described in claim 6, wherein the person featurizer is adapted to determine sentiment data related to one or more emotional states via the visual features of the person's associated multi-camera track.

8. The visual tracking system described in claim 7, wherein:
the monitored location is a customer-oriented environment; and
the visual tracking system further comprises one or more customer-oriented devices and a recommendation module, the recommendation module is adapted to extract context data for each person by analyzing the person feature vector of the person, identify a customer need for the person by analyzing the context data and sentiment data, and generate an action recommendation to address the customer need, the recommendation module is further adapted to cause one of the customer-oriented devices to perform a customer-oriented action in accordance with the action recommendation.

9. The visual tracking system described in claim 8, wherein:
each video frame has one or more defined points of interest, each point of interest corresponding to one of the customer-oriented devices or a region within the monitored location associated with a customer interaction; and
the context data for each person is drawn from a list comprising positional context data, environmental context data, and visual context data, the positional context is determined by comparing the motion data of each person with the points of interest of the video frame, the environmental context data corresponds to a temperature characteristic affecting the person, and the visual context data corresponds to one or more of the visual features of the person.

10. The visual tracking system described in claim 9, wherein the person featurizer and the recommendation module are implemented using a neural network.

11. A method for tracking and identifying a plurality of persons within a monitored location, comprising the steps of:
providing a first camera;
providing a person featurizer;
providing a tracking module;
capturing a sequence of video frames comprising a current video frame and a prior video frame, each video frame depicting a plurality of detections, each detection corresponding to a portion of the video frame depicting one of the persons, each detection further having visual features, and motion data describing relative movement of the person within the video frame;
defining one or more incumbent tracks, each incumbent track is linked to a track identity associated with one of the persons depicted in the prior video frame, describing the visual features of the person via an incumbent track person feature vector, and defining incumbent track motion data for each incumbent track;
generating a person feature vector for each detection within the current video frame using the person featurizer, and describing the visual features of the detection using the person feature vector;
establishing a predictive pairing by the tracking module between each detection and each incumbent track, determining a motion prediction probability by comparing the motion data of the detection with the incumbent track motion data, and determining a featurization similarity probability by comparing the person feature vector of the detection with the incumbent track person feature vector;
calculating a likelihood value for each predictive pairing by combining the motion prediction probability and the featurization similarity probability, the likelihood value representing a probability that the person associated with the detection corresponds to the person associated with the incumbent track; and maintaining the track identity of each person depicted in the current video frame by selecting one of the predictive pairings for each detection by maximizing the likelihood values across all the selected predictive pairings using a combinatorial optimization.

12. The method as recited in claim 11, wherein:
the step of generating a person feature vector for each detection is followed by the step of defining a new track for each detection by the tracking module;
the step of establishing a predictive pairing is followed by the step of establishing a new track pairing between each detection and each new track, setting the likelihood value of each new track pairing to a new track threshold;
the step of maintaining the track identity of each person further comprises selecting one of the predictive pairings or new track pairings for each detection by maximizing the likelihood values across all the selected predictive pairings and new track pairings using a combinatorial optimization; and
the step of maintaining the track identity of each person is followed by the step of establishing a new track identity for each person whose detection is matched to one of the new tracks.

13. The method as recited in claim 12, wherein the step of establishing a predictive pairing is preceded by the step of defining a matching matrix by the tracking module, the matching matrix having one or more rows and one or more columns, associating each detection with one of the columns, and associating each row with one of the incumbent tracks or new tracks.

14. The method as recited in claim 13, wherein:
the step of providing a first camera is followed by the step of providing a second camera;
the step of defining one or more incumbent tracks is followed by the step of defining one or more second camera incumbent tracks associated with the second camera, describing the visual features of one of the persons within the monitored location using a second camera person feature vector;
the step of establishing a new track identity is followed by the step of comparing the person feature vector of each incumbent track of the first camera to the second camera person feature vector of each second camera incumbent track, and merging each incumbent track and each second camera incumbent track which describe the same person, and producing a multi-camera track linked to the track identity of said person.

15. The method as recited in claim 14, wherein:
the step of defining one or more incumbent tracks further comprises associating each incumbent track with a video capture time;
the step of defining one or more second camera incumbent tracks further comprises associating each second camera incumbent track with a second camera capture time; and
the step of comparing the person feature vector of each incumbent track to the second camera person feature vector further comprises excluding from merging any incumbent track and second camera incumbent track captured prior to a time window occurring before a current time.

16. The method as recited in claim 15, wherein the step of comparing the person feature vector of each incumbent track to the second camera person feature vector is followed by the step of determining demographic data for each person via the visual features associated with the person's track identity.

17. The method as recited in claim 16, wherein the step of determining demographic data is followed by the step of determining sentiment data for each person related to one or more emotional states via the visual features associated with the person's track identity.

18. The method as recited in claim 17, wherein the monitored location is a customer-oriented environment and has one or more customer-oriented devices, and the step of determining sentiment data is followed by the steps of:
extracting context data for each person by analyzing the person feature vector of the person;
identifying a customer need for each person by analyzing the context data and sentiment data using a recommendation module; and
generating an action recommendation to address the customer need of the person, and causing one of the customer-oriented devices to perform a customer-oriented action in accordance with the action recommendation.

19. The method as recited in claim 18, wherein:
the step of capturing a sequence of video frames further comprises defining one or more points of interest in each video frame, each point of interest corresponding to one of the customer-oriented devices or a region within the monitored location capable of enabling a customer interaction; and
the step of extracting context data further comprises extracting context data for each person by analyzing the person feature vector of the person, the context data for each person is drawn from a list comprising positional context data, environmental context data, and visual context data, determining the positional context data by comparing the motion data of each person with the points of interest of the video frame, determining the environmental context data by reading a temperature characteristic affecting the person, and determining the visual context data by analyzing the visual features of the person.

* * * * *